(12) United States Patent
Schaper et al.

(10) Patent No.: US 6,590,752 B1
(45) Date of Patent: Jul. 8, 2003

(54) ELECTRONIC CONTROL DEVICE

(75) Inventors: Elmar Schaper, Lügde (DE); Frank Doellerer, Hameln (DE); Detlef Schurgens, Blomberg (DE); Matthias Ragaller, Bad Lippspringe (DE)

(73) Assignee: Phoenix Contact GmbH & Co., Blomberg (DE)

( * ) Notice: Subject to any disclaimer, the term of this patent is extended or adjusted under 35 U.S.C. 154(b) by 0 days.

(21) Appl. No.: 09/430,380

(22) Filed: Mar. 17, 2000

(30) Foreign Application Priority Data

Apr. 19, 1999 (DE) .................................... 299 06 955 U

(51) Int. Cl.[7] .............................................. H02H 5/04
(52) U.S. Cl. .......................................... 361/23; 361/29
(58) Field of Search ..................... 361/23, 28, 29–31, 361/33, 78, 79; 318/434; 388/815, 903; 700/286, 292, 293, 297

(56) References Cited

U.S. PATENT DOCUMENTS

| | | | | |
|---|---|---|---|---|
| 3,749,981 | A | * 7/1973 | Koltuniak et al. | 165/104.34 |
| 4,763,224 | A | * 8/1988 | Bentz et al. | 340/638 |
| 5,835,324 | A | * 11/1998 | Hatton | 361/93.1 |
| 6,185,100 | B1 | * 2/2001 | Bentz et al. | 165/185 |

* cited by examiner

*Primary Examiner*—Kim Huynh

(57) ABSTRACT

An electronic control device has a power switch for driving and supplying an electrical drive for a fitting which is to be controlled. The invention provides for the power switch to be driven by an electronic computer assembly arranged inside the housing of the control device and which can be supplied with parameterization data for driving the electrical drive for the fitting.

17 Claims, 5 Drawing Sheets

ELECTRONIC CONTROL DEVICE

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates to an electronic control device with integrated fittings protection, particularly for power station applications, comprising at least one power switch for driving and supplying an electrical drive for a fitting which is to be controlled, wherein the at least one power switch of said electronic control device is driven by an electronic computer assembly, whereby said power switch and said electronic computer assembly are arranged inside the housing of the control device, and whereby the electronic computer assembly is supplied with parameterization data for driving the electrical drive for the fitting.

TECHNICAL FIELD

The fittings driven according to the invention have a wide variety of uses, particularly in power station installations, for actuating slides, shutoff devices or valves, for example, whose failure can entail considerable damage to associated machines or even endanger the operators or the environment.

Consequently, the operation of such devices and the recording and avoidance of failures in the fittings take on a greatly increased importance. In conventional control devices for such fitting, bimetallic contacts have been used up to now for recording and limiting electrical supply powers which have risen by comparison with the normal operating states. However, since the warming-up of such bimetallic contacts requires particular minimum warm-up times, which may be much too long, however, to prevent damage t the drive units or the driven fittings, this disconnection response frequently entails problems. In addition, even though they provide an optimum control response for many applications, such contacts are subject to wear, which generally has a negative effect on their switching response.

Frequently, simply disconnecting and connecting a drive unit is not sufficient to satisfy all safety-related requirements, and it would be desirable if a differentiated control response could be matched to the particular given requirements.

The invention is based on the object of developing an electronic control device in accordance such that the above disadvantages are avoided and, in particular, a flexible and very-reliable control response is always allowed.

SUMMARY OF THE INVENTION

This object is achieved surprisingly simply in a control device of this generic type in that the at least one power switch for controlling the electrical drive for the fitting is driven by an electronic computer assembly which is arranged inside the housing of the control device and which can be supplied with parameterization data for driving the electrical drive for the fitting. This allows a very precise control response depending on the parameterization data which is input, and there is essentially no wear on the control device over time.

Manual parameterization is achieved in an inexpensive control device in that actuation devices mounted on the housing can be used to supply the computer assembly with parameterization data for driving the electrical drive for the fitting.

Using an external control device, such as a personal computer or a bus adapter assembly, an interface device can be used to supply the computer assembly in a particularly advantageous manner with parameterization data for driving the electrical drive for the fitting, and recorded data can be read out and transmitted.

In this case, momentary values of the power, particularly the real power, which is output can be recorded by a power measuring device and can be compared with associated nominal values.

In accordance with the invention, however, the control device can also have a device for recording at least one electrical quantity which is used to determine, for example as a result of calculation by the computer assembly, the power, particularly the real power, which is output to the drive.

By way of example, it is particularly advantageous to record the real power in drive machines with a small load, since, in this case, the current variation is relatively small. In such a case, a change in the load essentially involves a change in the phase angle, and hence evaluating the recorded real power equates with even more effective machine and installation protection than purely observing the motor 5 current or the apparent power.

A memory device which can be used to store the recorded quantity, particularly the power which is output to the drive, as a function of time and/or displacement can document procedures or can temporarily store motion data from the computer assembly. The memory device advantageously also stores nominal characteristic curves for the drive as a function of displacement and/or time.

In a further preferred embodiment, the computer device can be used to calculate torque values for the drive from the recorded power which is output to the drive, and the torque values can be stored in the memory device and can be compared with nominal characteristic curves for the drive as a function of displacement and/or time. In this case, a person skilled in the art is well aware that the torque depends on the power, particularly the real power, which is output to the drive.

In a further preferred embodiment, the memory device stores control data for voltage and/or current profiles which allows the drive to be started up and/or slowed down steadily, in particular smoothly.

A particularly reliable response is additionally achieved in that the computer device can use the data stored in the memory device to record increased torque values, and, if an increased torque is above a predefined threshold value, a startup operation can be triggered, with prior reverse running and renewed startup, in which case reconnection is not permissible after triggering in the event of excessive torque.

If the computer assembly can be used to calculate a speed-dependent braking and acceleration response using the data stored in the memory device, said braking and acceleration response being able, particularly at any speed, both to cause the drive to stop reliably and to cause the drive to be moved into a predefined safety position, safety disconnection can be effected at any time and without taking a lot of time, irrespective of the motion state of the drive for the fitting.

Quite generally, the computer assembly can trigger any desired operating, safety and/or maintenance functions by responding to a comparison including a stored nominal characteristic curve and at least one momentary value of a recorded electrical quantity for the drive. By way of example, this pertains to emergency disconnection of the drive via a load-shedding relay, alarm signaling, or alternatively signaling the occurrence of wear in a tool, which can be recorded by measuring the real power.

To produce a particularly compact design for the control device, the control device can be arranged in a single housing which has, on its underside, cooling devices and mounting devices for mounting the control device.

The control device according to the invention provide, optimum motor and installation or machine protection for many areas associated with processing machines, in conveying/transport engineering and in broad areas of process engineering.

BRIEF DESCRIPTION OF THE DRAWINGS

The invention is described in more detail below with the aid of preferred embodiments and with reference to the appended drawings, in which.

DETAILED DESCRIPTION OF THE DRAWINGS

Figure 1:
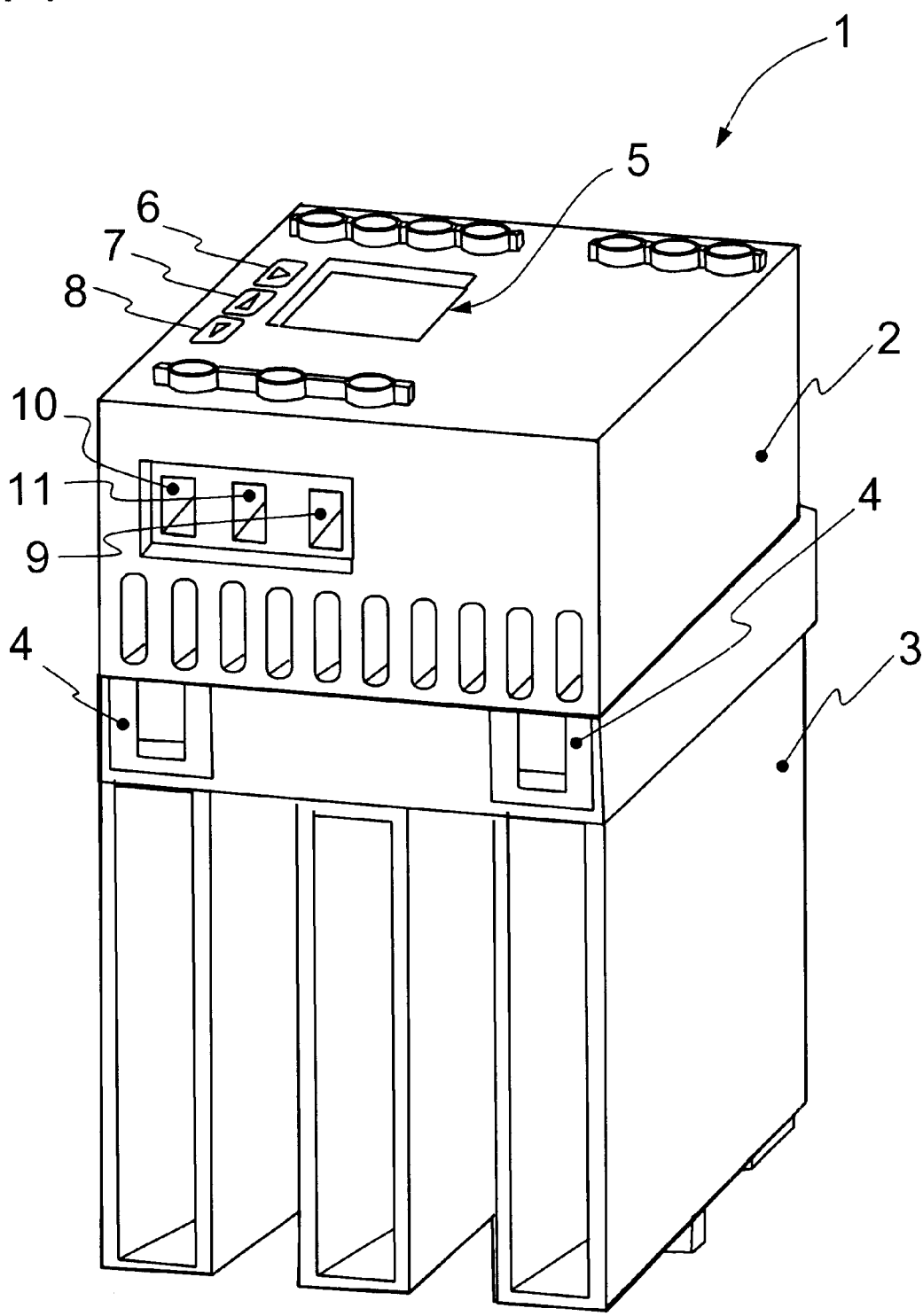
FIG. 1 shows a perspective view of the housing of a first embodiment of the electroniccontrol device with integrated fittings protection.

The first point of reference is FIG. 1, which shows a perspective illustration of the electronic control device according to the invention, denoted as a whole by 1. The dielectric housing 2 is held firmly on the heat: sink 3 by means of latching clips 4.

On the top of the housing 2, there is a display device 5 and, next to this, membrane switches 6, 7, 8 which can be used to input parameterization data which can be shown on the display device 5.

On the front of the housing 2, there are openings 9, 10, 11 for receiving connection lines for the drive devices (not shown) for an electrically driven fitting, such as is used in power stations, for example. The openings 9, 10, 11 contain connection devices (known to a person skilled in this field) for hard-wiring the connection lines.

Figure 2:
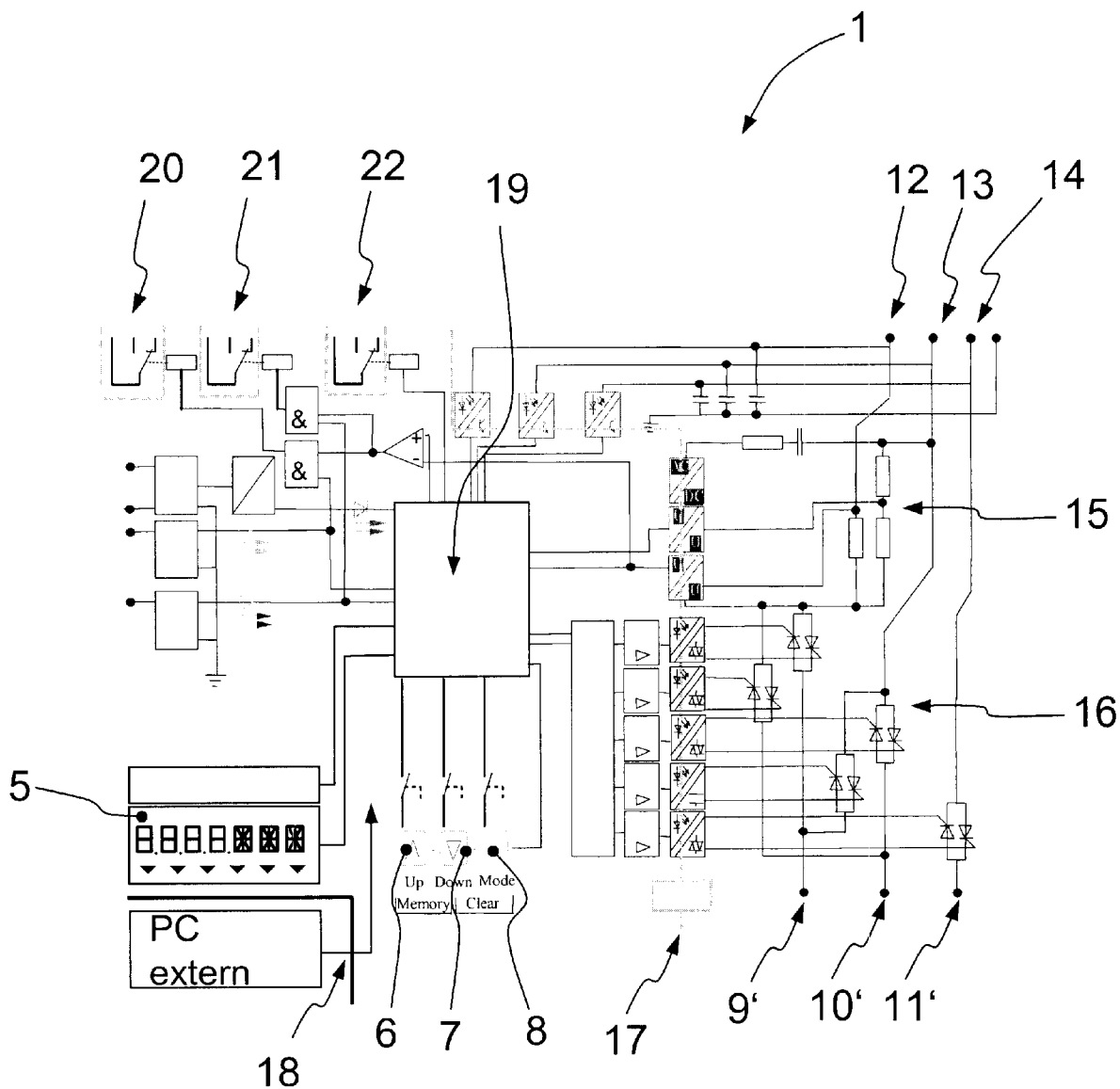
FIG. 2 shows a block diagram of the electronic assemblies of the control device.

The following discussion refers to FIG. 2, which snows a block diagram illustrating the essential-electronic assemblies of the control device 1.

The reference numerals 12, 13, 14 denote a three-phase AC connection which is preferably connected to the electrical supply network of a public operator.

The reference numeral 15 denotes a current and voltage measuring device which can be used to record the respective power of the individual phases of the AC supply separately.

The power semiconductor switches, which are preferably thyristors, can be used to effect phase angle control and, by adjusting the phases, to reverse the direction of rotation of the AC current output to the connection devices 9', 10', 11'.

Both the current and voltage measuring device 15 and the power semiconductor switches 16 are decoupled by a DC isolating device 17, which is produced using transformers or optocouplers, for example.

An interface device 18 is used to connect the electronic control device 1 to external communication devices, such as a field bus.

In a particularly preferred embodiment, the electronic control device 1 is an interbus assembly and can communicate either directly with the serial bus of the interbus or with a bus adapter assembly. In an alternative embodiment, the interface 18 can be connected to an external personal computer, PC, which communicates with the control device.

The interface device 18, the display device 5 and the membrane switches 6, 7, 8 are connected to a computer assembly 19 which has a microprocessor and the required on-chip memory devices for operation according to the invention.

The computer assembly 19 is also connected to relay assemblies 20, 21 and 22 which can be used to accomplish external switching or reporting procedures. If a nominal value stored in the memory of the computer assembly 19 is exceeded by a predefined threshold value, the relay 22, for example, can be used to signal a report about a shutdown failure.

Such characteristic curve data forming the basis of shutdown failure recognition can be stored in the memory device of the computer assembly 19 using the membrane switches 6, 7, 8 or using the interface device 18. In the simplest case, this parameterization data can be constant maximum values for the torque or the power which is output, with a disconnection procedure being carried out if they are exceeded; alternatively, in a further embodiment according to the invention, the power which is output to the drive can be freely stipulated and stored as a function of time or displacement.

By appropriately stipulating nominal values, the drive can also be controlled such that starting up and slowing down are gentle and smooth. To this end, the appropriate characteristic curves for the drive are stored in the memory device as a function of displacement and/or time. The data recorded by the current and voltage measuring device and the quantities converged into power or torque values by the computer assembly 19 can in each case be compared momentarily, or in association with particular displacement points, with any desired stored characteristic curves for selected electrical drives. For this, it is within the scope of the invention to predefine standard stipulated values for particular drive classes.

In this way, it is possible to prevent high-cost and safety-critical fittings from becoming damaged or destroyed, and, even if subtle changes occur during operation of the fitting, it is possible to recognize wear in the drive or in the driven fitting, usually as a result of increased friction values, and to prevent failure before it occurs.

Particularly advantageously, the drive can be stopped gently when an excessively high torque value is reached, the drive can be put into reverse and disconnection or one or more renewed startup operations can then be carried out under program control.

In a particularly preferred embodiment according to the invention, the entire electronic control device 1 is accommodated in a single housing 2, and the housing 2 can have further interface devices (not shown in the figures), such as optical connector assemblies for optical fibers.

Figure 3:
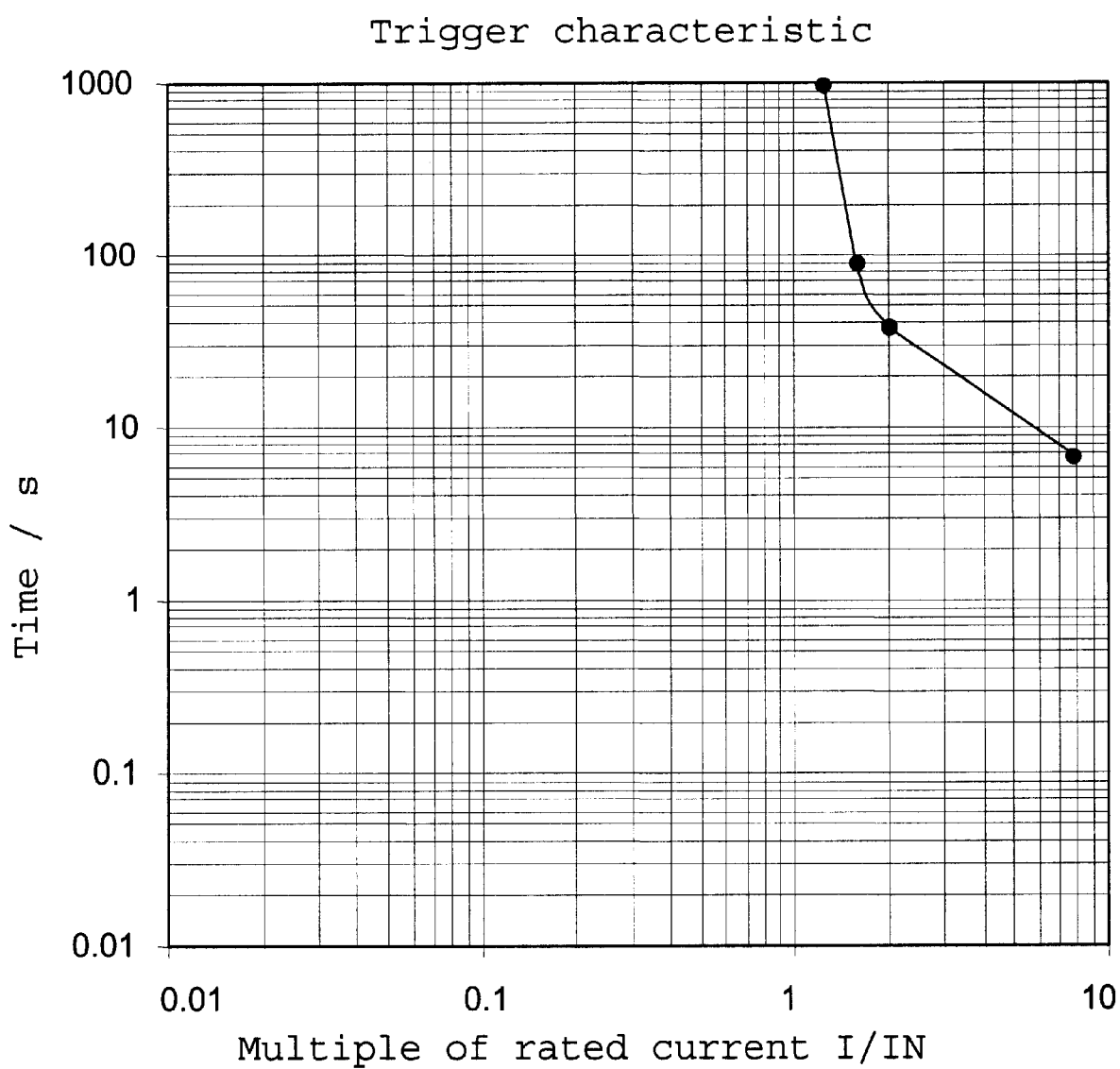
FIG. 3 shows the trigger characteristic of a bimetallic contact control device for disconnection in the event of overload.
Figure 4:
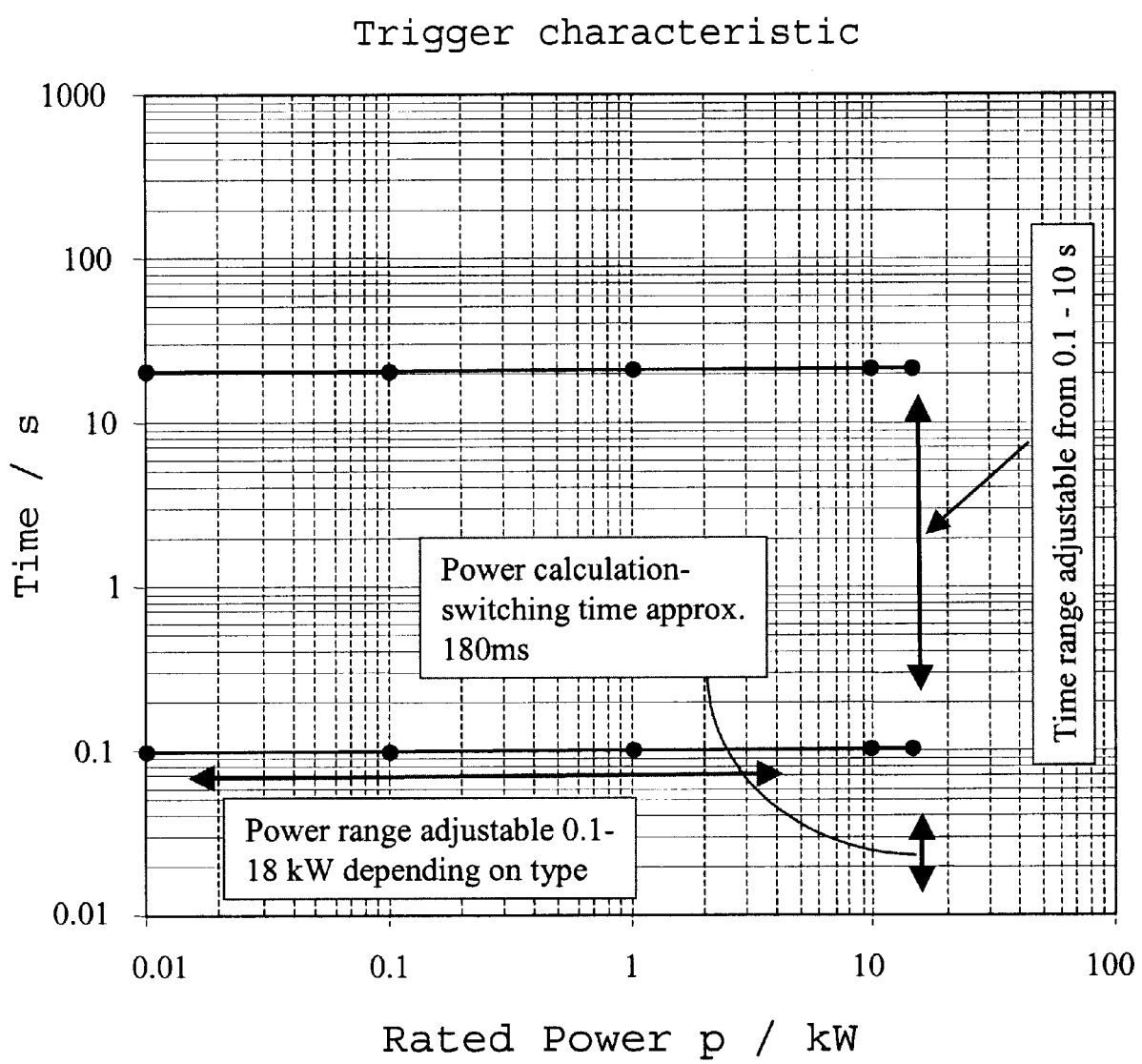
FIG. 4 shows the trigger characteristic of the control device according to the invention.

To demonstrate the advantages according to the invention, the following discussion refers to FIGS. 3 and 4. FIG. 3 shows the disadvantageous time dependent trigger characteristic (mentioned in the introduction) of a conventional bimetallic switch. It is clearly apparent that the switching time required is dependent on the rated current, and short disconnection times can be achieved only for very high rated current values.

By contrast, FIG. 4 shows the switching response, which is completely independent of the rated power, of the electronic control device according to the invention, in which less than 200 ms of time elapses for the power calculation by means of the computer assembly 19 together with the switching time of the power semiconductor switches before disconnection takes place. In a particularly advantageous embodiment, it should be mentioned in this regard that, in order to produce an increased braking torque, it is also possible to apply electrical power in antiphase, electrical power tending to rotate the drive backward, to the drive. This can result in very rapid and consequently very reliable disconnection procedures in a selectable power range, depending on the electrical power to be controlled, said disconnection procedures reliably preventing the driven fitting from being destroyed or damaged.

Figure 5:
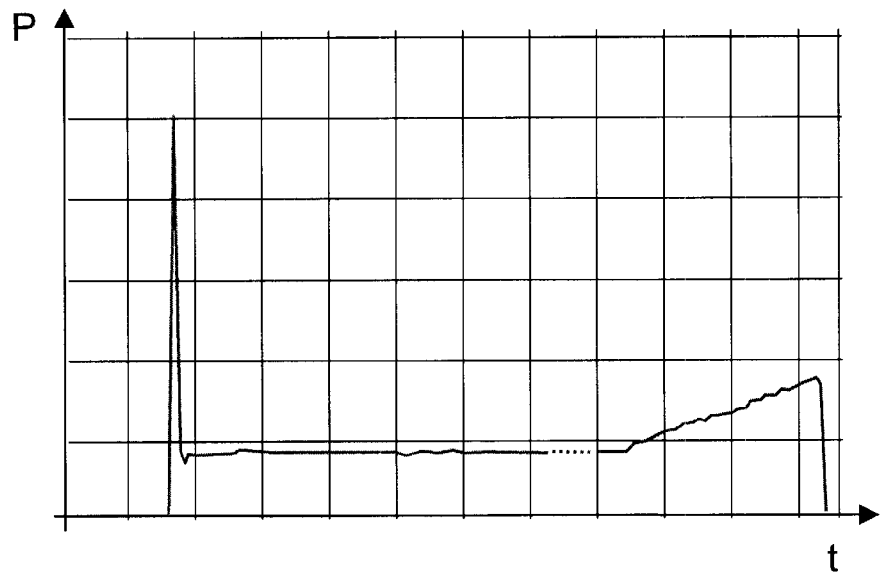
FIG. 5 shows a recorded real power profile for an actuating fitting controlled by a control device according to the invention.

FIG. 5 shows the measured real power profile when an actuating fitting closes. An illustrative electronic control device according to the invention records the three currents, voltages and the phase angle for the drive for the actuating fitting and calculates the real power consumption of the drive. Every 20 ms, a power value is determined and thus allows continuous monitoring of the state. FIG. 5 shows a typical real power profile when the actuating fitting closes. The critical point of this handling curve is shutdown. If a mechanical torque switch fails at this point, the fitting will be mechanically destroyed. Hence, it is this very area which has to be monitored. For this, the upper power threshold value is placed just above the trigger point of the torque switch, and optimum protection is achieved for the high-cost fitting. Within approx. 40 ms, the computer assembly disconnects the drive machine by means of a load-shedding relay and signals this state via a reporting output. The kinetic energy (run-on) of the motor can optionally be reduced abruptly using a temporally adjustable reversing pulse which drives a reversing load-shedding relay. In parallel with the 5 monitoring function, the power values of the last handling curve are permanently stored in a data storage mode and are available for fault analyses or cyclic state assessment of the actuating drive. The power value when the motor starts up is significantly above the protection threshold and must not be taken into account during monitoring. To this end, a temporally variable window is placed over the startup range, which temporarily breaks off, i.e. delays, monitoring. An RS232 interface can be used to adjust all the parameters of the load-shedding relay, for example using a notebook as well. In addition, a learning mode is implemented here which allows power curves for a wide variety of working procedures to be recorded. The curve profiles are evaluated on the monitor and the necessary switching and reporting thresholds are defined. Furthermore, in the embodiment of the invention which has been described, a "compare" mode is implemented in addition to the learning mode described above. In this case, a "tubular curve" can be placed over the recorded power profile. This parameterizable tolerance band can be permanently monitored and compared with the actual values determined. The control device according to the invention reacts to any departure from this band with a report or the rapid disconnection described.

Figure 6:
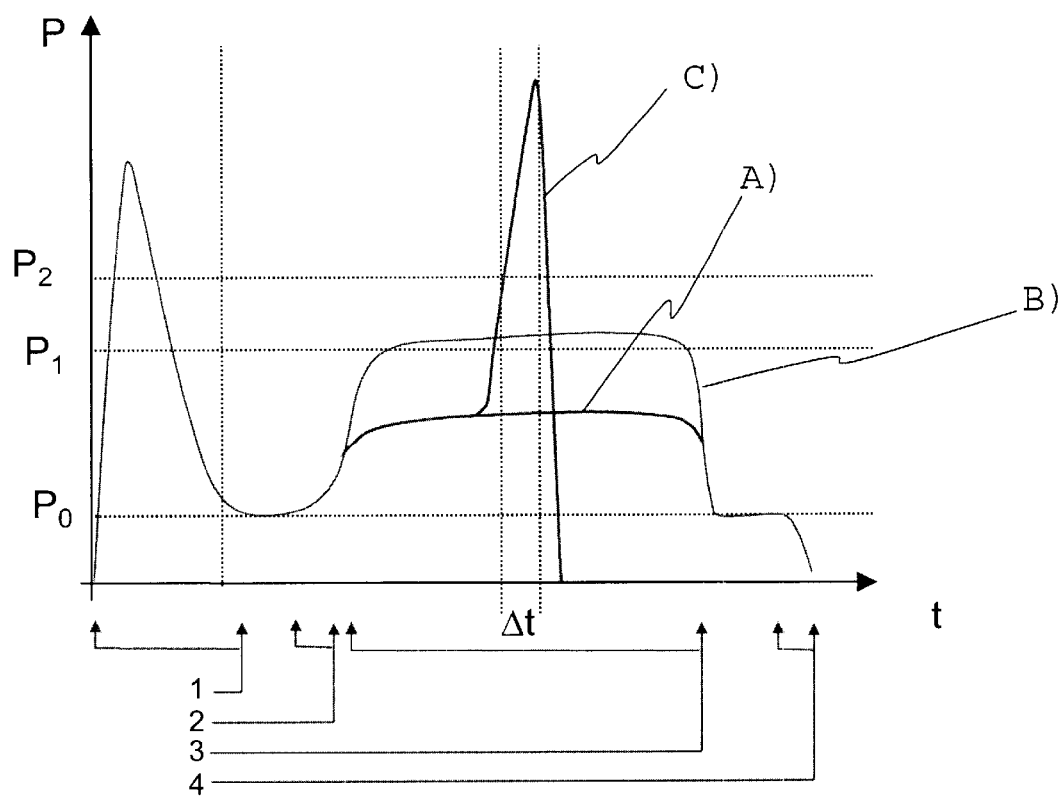
FIG. 6 shows a recorded real power curve for a milling tool controlled by a control device according to the invention.

FIG. 6 shows the typical real power curve for a milling or drilling tool driven by means of another illustrative electronic control device. Parameterization to the real power curve determined takes place as below using the input devices described above. Motor startup (range 1) is not taken into account and is therefore masked out of monitoring using time-delay suppression. In range 2, the tool is put into position, range 3 describes the actual milling procedure, and the drive is disconnected in range 4. The normal state (curve A) was determined using a sharp milling or drilling tool. A blunt milling tool causes an increase in power (curve B). A reporting threshold was placed on this value P1, with P0 corresponding to the idling power. If the real power P1 is exceeded, this is then automatically reported by the control device in order to indicate that a tool change is necessary. An extremely sheer power increase, for example caused by the feed being adjusted incorrectly, can cause the tool to break. To prevent this breakage, the power threshold P2 is set. So that the control device according to the invention does not react to every short power peak, a delay time $\Delta t$ is set at this point. If the power value is still above the threshold value at the end of the delay time, the drive is disconnected within a few ms. This state is indicated at the reporting output and can be forwarded to a superordinate controller, for example, using a field bus adapter. Such a field bus adapter is also used to provide online monitoring of the electronic control device, for example.

In a further embodiment of the invention, pumps are controlled and monitored using an electronic control device according to the invention. The upper reporting threshold signals contamination in the filter, for example, and the switching threshold prevents repercussions caused by blockages. A lower switching threshold—designed to be somewhat less responsive using a time delay—additionally monitors the pump for running dry. A display for the appliance continually provides up-to-date information on voltages, currents, phase angles, real power and volt-amps reactive, mains frequency and phase failure or unbalances. The appliance according to the invention contains not only a complete electronic reversing load-shedding relay but also all the monitoring, protection and reporting functions, which means that additional signal delay times for controllers or control systems are eliminated, which would otherwise delay rapid reaction.

What is claimed is:

1. An electronic control device with integrated fittings protection, particularly for power station applications, comprising at least one power switch for driving and supplying an electrical drive for a fitting which is to be controlled, wherein the at least one power switch of said electronic control device is driven by an electronic computer assembly, whereby said power switch and said electronic computer assembly are arranged inside the housing of the control device, and whereby the electronic computer assembly is supplied with parameterization data for driving the electrical drive for the fitting, and a memory device, in which a nominal characteristic curve for the drive is stored.

2. The electronic control device as claimed in claim 1, wherein actuation devices mounted on the housing are used to supply the computer assembly with parameterization data for driving the electrical drive for the fitting.

3. The electronic control device as claimed in claim 1, wherein an interface device is used to supply the computer assembly with parameterization data for driving the electrical drive for the fitting.

4. The electronic control device as claimed in claim 1, wherein the interface device is an optical interface device having associated connection devices, arranged on the housing, for optical fiber transmission devices.

5. The electronic control device as claimed in claim 1, additionally distinguished by a power measuring device which is used to record the power, particularly the real power, which is output to the drive.

6. The electronic control device as claimed in claim 1, distinguished by at least one device for recording at least one electrical quantity which is used to determine the electrical power, particularly the real power, which is output to the drive.

7. The electronic control device as claimed in claim 6, wherein the device for recording at least one electrical quantity is designed to record at least one of a voltage, a current level and a phase, with the computer assembly receiving the values determined and calculating the power, particularly the real power, which is output to the drive.

8. The electronic control device as claimed in claim 1, distinguished by a memory device which is used to store a recorded quantity, particularly the power which is output to the drive, as a function of at least one of time and displacement.

9. The electronic memory device as claimed in claim 8, wherein the memory device stores nominal characteristic curves for the drive as a function of at least one of displacement and time.

10. The electronic control device as claimed in claim 8, distinguished by the storage of a nominal characteristic curve for at least one electrical quantity, the computer assembly triggering at least one of an operating, safety and maintenance function in response to a comparison including at least one value form the nominal characteristic curve and at least one momentary value of an electrical quantity for the drive.

11. The electronic control device as claimed in claim 8, wherein the computer device is used to calculate torque values for the drive for the recorded power which is output to the drive, and these torque values are stored in the memory device and are compared with nominal characteristic curves for the drive as a function of at least one of displacement and time.

12. The electronic control device as claimed in claim 8, wherein the memory device stores control data for at least one of voltage and current profiles which allows the drive to be started up and slowed down steadily, in particular smoothly.

13. The electronic control device as claimed in claim 8, wherein the computer device uses the data stored in the memory device to record increased torque values, and, if an increased torque is above a predefined threshold value, a startup operation is triggered, with prior reverse running and renewed smooth startup.

14. The electronic control device as claimed in claim 8, wherein the computer assembly is used to calculate a speed-dependent braking and acceleration response using the data stored in the memory device, said breaking and acceleration response being able, at any speed, both to cause the drive to stop reliably and to cause the drive to be moved into a predefined safety position.

15. The electronic control device as claimed in claim 1, wherein the control device is arranged in a single housing which has, on its underside, cooling devices and mounting devices for mounting the control device.

16. The electronic control device as claimed in claim 1, comprising a reversing device that reverses the direction of rotation of the drive in response to a signal from the computer assembly, which triggers the signal after a stipulated real power threshold has been recognized to have been exceeded or undershot.

17. The electronic control device as claimed in claim 1, wherein, for the comparison, the computer assembly takes into account at least one of a stipulated time delay and a stipulated maximum permissible difference.

* * * * *